(12) United States Patent
Goodwin et al.

(10) Patent No.: US 7,747,485 B2
(45) Date of Patent: Jun. 29, 2010

(54) VARIABLE ACCOUNT DATA INFORMATION SYSTEM AND METHOD

(75) Inventors: Deborah Goodwin, Birmingham, AL (US); Brendan Johnson, Hoover, AL (US); Joyce Weaver, Birmingham, AL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1744 days.

(21) Appl. No.: 10/279,441

(22) Filed: Oct. 24, 2002

(65) Prior Publication Data

US 2004/0083146 A1 Apr. 29, 2004

(51) Int. Cl.
*G07F 19/00* (2006.01)
*H04M 15/00* (2006.01)

(52) U.S. Cl. .......................................... 705/34; 705/30
(58) Field of Classification Search .................. None
See application file for complete search history.

(56) References Cited

U.S. PATENT DOCUMENTS

| | | | |
|---|---|---|---|
| 5,987,434 A | 11/1999 | Libman | |
| 6,076,072 A | 6/2000 | Libman | |
| 6,434,534 B1 * | 8/2002 | Walker et al. | 705/14 |
| 6,672,507 B1 * | 1/2004 | Walker et al. | 235/456 |
| 6,993,510 B2 * | 1/2006 | Guy et al. | 705/68 |
| 2001/0009002 A1 * | 7/2001 | Logan et al. | 705/34 |
| 2002/0026394 A1 * | 2/2002 | Savage et al. | 705/34 |
| 2002/0087409 A1 * | 7/2002 | Joao | 705/14 |
| 2002/0169664 A1 * | 11/2002 | Walker et al. | 705/14 |

* cited by examiner

*Primary Examiner*—F. Zeender
*Assistant Examiner*—Christopher Buchanan
(74) *Attorney, Agent, or Firm*—Parks IP Law LLC; Jennifer P. Medlin, Esq.

(57) ABSTRACT

A system for creating a plurality of client mailers for a plurality of clients of a communication service provider having an account database storing client account data related to one or more services provided by the communication service provider to each client during a billing cycle includes first and second assembly modules. The first assembly module is operable to receive common data and variable data. The common data comprises data to be included in each client mailer, and the variable data is used for selecting client account data specific to each client for inclusion into the client mailer. The first assembly module is further operable to generate advisement data based on the client account data specific to the client and the variable data and store the common data, the selected client account data, and the advisement data in a mailer template file. The second assembly module is operable to access the mailer template file and for each client and create corresponding client mailer data comprising the common data, the selected client account data specific to the client, and the advisement data and store the corresponding client mailer data for each client in a mailer file.

21 Claims, 8 Drawing Sheets

VARIABLE ACCOUNT DATA INFORMATION SYSTEM AND METHOD

BACKGROUND

1. Field of the Invention

The invention relates to systems and methods for generating client mailers, and more particularly to systems and methods for generating a plurality of client mailers for a plurality of clients of a communication service provider.

2. Description of the Related Art

Systems for providing direct mail to a plurality of recipients are known. Most of these systems, however, generate client mailers that do not include client specific information, or generate client mailers that do not include variable account data specific to the client recipients. Furthermore, none of these systems generate a plurality of client mailers for a plurality of clients of a communication service provider that include client account data specific to the client and advisement data based on the client account data.

SUMMARY

A system for creating a plurality of client mailers for a plurality of clients of a communication service provider having an account database storing client account data related to one or more services provided by the communication service provider to each client during a billing cycle includes first and second assembly modules. The first assembly module is operable to receive common data and variable data. The common data comprises data to be included in each client mailer, and the variable data is used for selecting client account data specific to each client for inclusion into the client mailer. The first assembly module is further operable to generate advisement data based on the client account data specific to the client and the variable data and store the common data, the selected client account data, and the advisement data in a mailer template file. The second assembly module is operable to access the mailer template file and for each client create corresponding client mailer data comprising the common data, the selected client account data specific to the client, and the advisement data and store the corresponding client mailer data for each client in a mailer file.

A method of generating a plurality of client mailers for a plurality of clients of a communication service provider comprises the steps of generating common data for the client mailer and generating variable data for the client mailer. An account database storing client account data related to one or more services provided by the communication service provider to each client during a billing cycle is accessed, and client account data from the account database according to the variable data for each client mailer to be generated is selected. Advisement data based on the client account data specific to the client and the variable data is generated for each client mailer to be created. The common data, the client account data, and the advisement data are stored in a mailer template file.

Another system for creating a plurality of client mailers for a plurality of clients of a communication service provider having an account database storing client account data related to one or more services provided by the communication service provider to each client during a billing cycle comprises a mailer template and an assembly module. The mailer template comprises common data and variable data. The assembly module accesses the mailer template and for each client creates corresponding client mailer data comprising the common data, client account data specific to the client, and advisement data. The client account data is selected from the account database according to the variable data. The advisement data is based on the client account data specific to the client and the variable data. The assembly module is further operable to store the client mailer data in a mailer file.

Another method of generating a plurality of client mailers for a plurality of clients of a communication service provider comprises the steps of generating common data for the client mailer and generating variable data for the client mailer. The common data and the variable data are combined into a mailer template. An account database storing client account data related to one or more services provided by the communication service provider to each client during a billing cycle is accessed, and client account data from the account database according to the variable data for each client mailer to be generated is selected. Advisement data based on the client account data specific to the client and the variable data is generated for each client mailer to be created. The common data, the client account data, and the advisement data are combined into corresponding client mailer data for each client mailer and the corresponding client mailer data is stored in a mailer file.

Another system for generating a plurality of client mailers for a plurality of clients of a communication service provider comprises means for generating common data for the client mailer and means for generating variable data for the client mailer. The common data and the variable data are combined into a mailer template by a means for combining, and client account data is selected from the account database according to the variable data for each client mailer to be generated by a means for selecting. A means for generating advisement data based on the client account data specific to the client and the variable data for each client mailer to be generated generates the advisement data, and the common data, the client account data, and the data are assembled into corresponding client mailer data for each client mailer to be generated by a means for assembling and stored in a means for storing.

DETAILED DESCRIPTION

Throughout the drawings, the same or similar reference numerals are applied to the same or similar parts and elements, and thus the description of the same or similar parts and elements will be omitted or simplified when possible.

Figure 1:
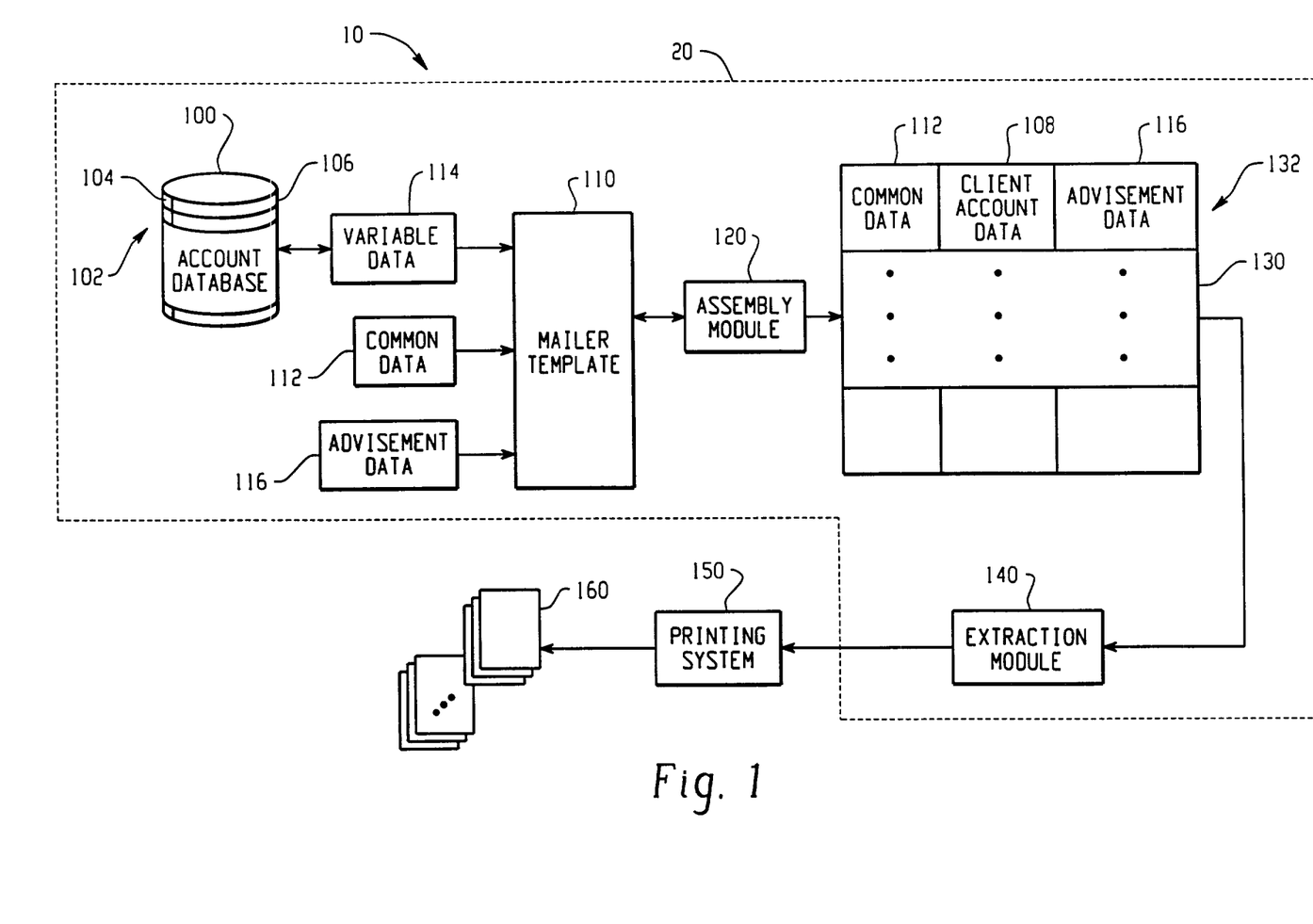
FIG. 1 is a block diagram of a system for generating a plurality of mailers based on variable account data.

FIG. 1 is a block diagram of a system 10 for generating a plurality of client mailers 160 on a computer system 20 based on variable account data. The computer system 20 may comprise a single computer, or alternatively may comprise a plurality of computers or computer systems distributed over a network. The computers or computer systems may further comprise common operating systems and hardware, or may alternatively comprise different operating systems and hardware in communication with each other.

The system 10 includes a client account database 100 comprising a plurality of records 102. Each record 102 includes a client identifier 104 and variable client account data 106. The client identifier 104 identifies a particular client of a communication service provider. Exemplary client account identifiers include client account numbers, or unique numbers associated with particular clients, such as social security numbers. Other client identifiers may also be used.

The client account data 106 relates to one or more services provided by the communication service provider to the client identified by the client identifier 104. Exemplary communication services include telephone services, Internet services, cable television services, mobile communication services, and the like. Other communication services may also be provided by the communication service provider.

Exemplary client account data 106 includes accrued charges for a current billing cycle for the one or more services provided by the communication service provider, the balance of a client's account, payment history, credit rating, and the like. Other client account data may also be included.

The client account database 100 stores information related to one or more services provided by the communication service provider for each client during one or more billing cycles, and is updated for each client during each billing cycle. Furthermore, the client account data 106 may also contain data related to one or more services offered by the communication service provider and not provided to the client identified by the client identifier 104. For example, if the communication service provider offers several long distance service plans, the client account data 106 for a particular client may indicate which of the long distance service plans the client is receiving and which of the long distance service plans the client is not receiving.

A mailer template 110 is used for creating a plurality of client mailers 160 for a plurality of clients of the communication service provider. The mailer template 110 includes selected client account data 108, common data 112, and advisement data 116. The mailer template 110 may be stored on the computer system 20 in a flat file format. Alternatively, the mailer template 110 may be an indexed flat file, an SGML file, or even a database file. Other file formats may also be used.

The common data 112 is included in each client mailer 160, and is the same data for each client mailer 160. For example, the common data 112 may include a common introductory paragraph for each client mailer 160, such as "You have always been a valued customer." Common data 112 may also include other data, such as formatting data, for example. The common data 112 may be generated manually via input and output devices at a computer terminal, or may be generated automatically from pre-existing common data 112, e.g. the system 10 may select common data 112 from a previously generated client mailer 160, or common data 112 from one of a set of client mailer types.

The selected client account data 108 stored in the mailer template 110 may be a subset or summary of the client account data 106. For example, if one of the services provided to the client by the communication service provider is a first Internet access service, the selected client account data 108 stored in the mailer file 110 may comprise summarized Internet access time over several billing cycles, and the related costs. Likewise, if one of the services provided to the client by the communication service provider is a first long distance plan, the selected client account data 108 stored in the mailer file 110 may comprise summarized long distance charges for several billing cycles.

The subset or summary of the account data 106 is determined by the variable data 114. The variable data 114 comprises variables from which client account data 106 specific to each client can be identified and accessed for inclusion into the client mailer 160. For example, the variable data 114 may identify particular clients to receive a client mailer 160, and particular client account data 106 to be included in each client mailer 160. Expanding further on this example, assume that client mailers 160 are to be generated for each client identified by client identifiers 104 having a current billing cycle balance in excess of $200.00 for a particular service provided by the communications service provider. The variable data 114 will thus be utilized to filter the client account database 100 to identify the clients matching these criteria and the corresponding client account data 106. The variable data 114 may be generated manually via input and output devices at a computer terminal, or may be generated automatically from preexisting variable data 114, e.g. the system 10 may select variable data 114 from a previously generated client mailer 160, or variable data 114 from one of a set of client mailer types.

The advisement data 116 is based on the selected client account data 108 specific to the client and the variable data 114. For example, if the selected client account data 108 stored in the mailer template 110 comprise summarized Internet access time over several billing cycles for a first Internet access service provide to the client and the related costs, the advisement data 116 may comprise a related cost over several billing cycles for Internet access time for a second Internet service offered by the communication service provider but not provided to the client. The client receiving the client mailer 160 could then compare the actual cost for the first Internet service currently provided by the communication service provider to an estimated cost for a second Internet service currently offered by the communication service provider. From this comparison, the client could then decide whether to contact the communication service provider to switch from the first Internet service to the second Internet service, or modify the service plan of the first Internet service.

After the selected client account data 108, the common data 112, and the advisement data 116 are stored in the mailer template 110, an assembly module 120 creates a mailer file 130. The assembly module 120 accesses the mailer template 110 and for each client identified by a client identifier 104 creates a corresponding record 132 in the mailer file 130. Each record 132 and the mailer file 130 includes selected client account data 108, the common data 112, and the advisement data 116. The mailer file 130 may be stored on the computer system 20 in a flat file format, or alternatively in an indexed flat file, an SGML file, or even a database file. Other file formats may also be used.

The assembly module 120 is stored as an executable software module on the computer system 20. Alternatively, the assembly module 120 may be stored in a script format, such as a CGI or PERL script, or may be implemented in a web-based platform independent environment, such as Java. Other types of software or devices for providing instructions to the computer system 20 may also be utilized to realize the assembly module 120.

Further included in the system 10 is an extraction module 140. The extraction module 140 is operable to access the mailer file 130 and convert the mailer filer 130 into a format readable by a printing system 150. The extraction module 140 may be stored as an executable software module on the computer system 20. Alternatively, the extraction module 140 may be stored in a script format, such as a CGI or PERL script, or may be implemented in a web-based platform independent environment, such as Java. Other types of software or devices for providing instructions to the computer system 20 may also be utilized to realize the assembly module 120.

The printing system 150 receives the output from the extraction module 140 and in turn is operable to print the client mailers 160. In one embodiment, the extraction module 140 produces a print file comprising a complete client mailer 160 for each client, and the printing system 150 comprises an Open Print system software available from Sefas Innovation, Inc. and an InfoPrint printer system available from IBM. Other printing system software and hardware may also be used. For example, the printing system 150 could comprise one or more network printers coupled to a Local Area Network (LAN).

Figure 2:
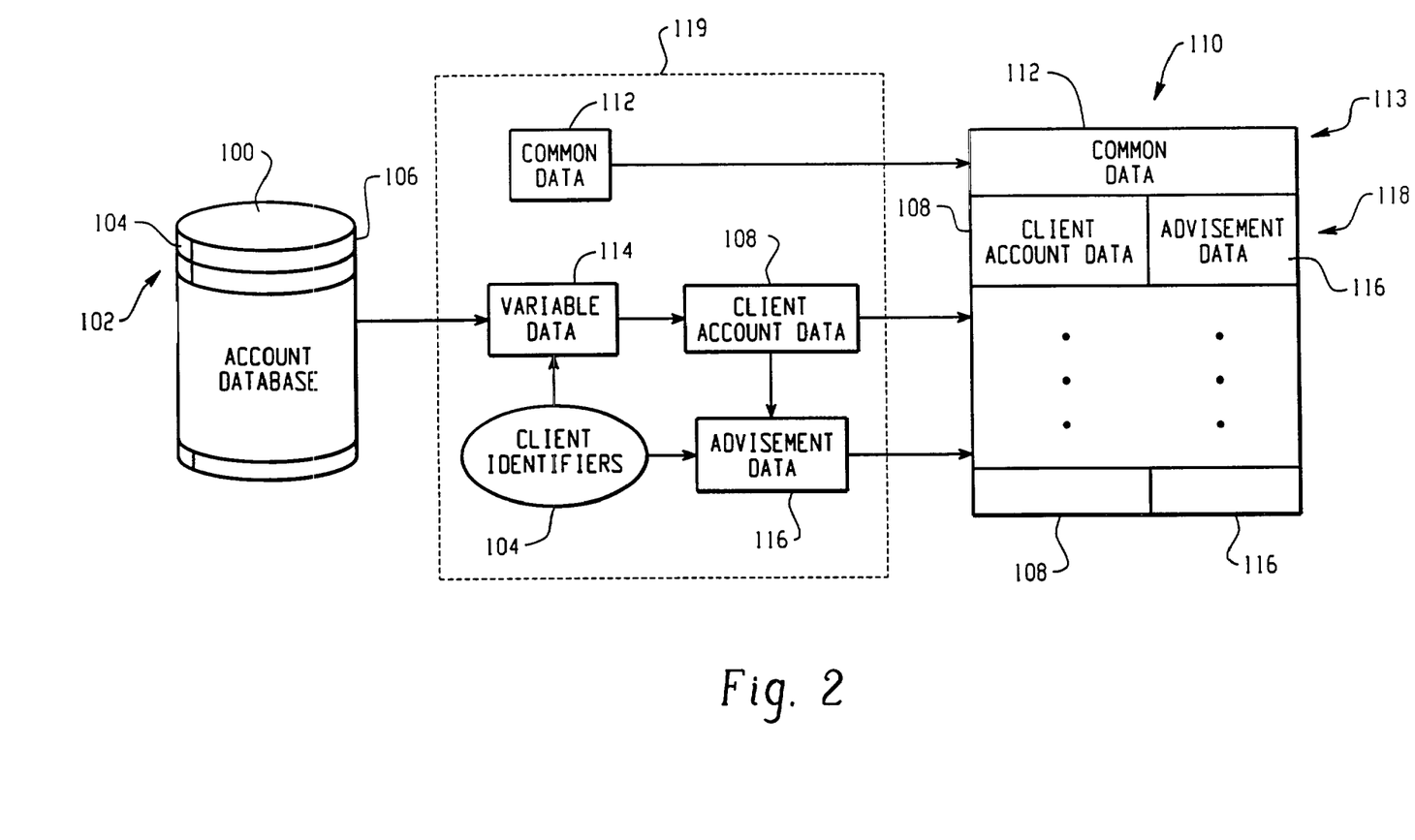
FIG. 2 is a block diagram illustrating a portion of the system that is operable to create a mailer template.

FIG. 2 provides a block diagram illustrating a portion of the system 10 that is operable to create the mailer template 110. The particular clients for whom a client mailer 160 is to be generated may be determined according to several different methods. In one embodiment, a list of client identifiers 104 is provided with the variable data 114. Based on the variable data 114 and the client identifiers 104, the corresponding client account data 106 for each corresponding client identified by a client identifier 104 is selected to create the selected client account data 108 for each client. By way of example, the variable data 114 may comprise variable operators used by the system 10 to select corresponding client account data 106 for a client identified by a client identifier 104. Thus, if a variable operator relates to a client's credit rating as stored in the client account database 100, the selected client account data 108 may comprise the credit rating of all clients identified by the client identifiers 104.

The advisement data 116 is based on the selected client account data 108 specific to the client specified by the client identifier 104 and the variable data 114. The system 10 may generate separate and different advisement data 116 for each client mailer 160. For example, if the account database 100 comprises data indicating that a particular client has either a "Good" or "Bad" credit rating, the system 10 may select different advisement data 116 for clients having a "Good" credit rating than for clients having a "Bad" credit rating.

The common data 112 is stored in a first record 113 in the mailer file 110. For each client mailer 160 to be generated, a corresponding record 118 in which is stored the selected client account data 108 and the advisement data 116 is included. Thus, the mailer template 110 stores only one set of common data 112, regardless of the quantity of client mailers 160 to be generated. Accordingly, the mailer template 110 is a relatively small file compared to the mailer file 130, which includes common data 112 in each record 132.

In another embodiment, the system 10 includes a preassembly module 119 operable to receive the common data 112, the variable data 114, and the client identifiers 104. The preassembly module 119 selects the client account data 108 and generates the advisement data 116 based on the selected client account data 108 specific to the client specified by the client identifier 104 and the variable data 114. The pre-assembly module 119 may be stored as an executable software module on the computer system 20. Alternatively, the pre-assembly module 119 may be stored in a script format, such as a CGI or PERL script, or may be implemented in a web-based platform independent environment, such as Java. Other types of software or devices for providing instructions to the computer system 20 may also be utilized to realize the pre-assembly module 119.

Figure 3:
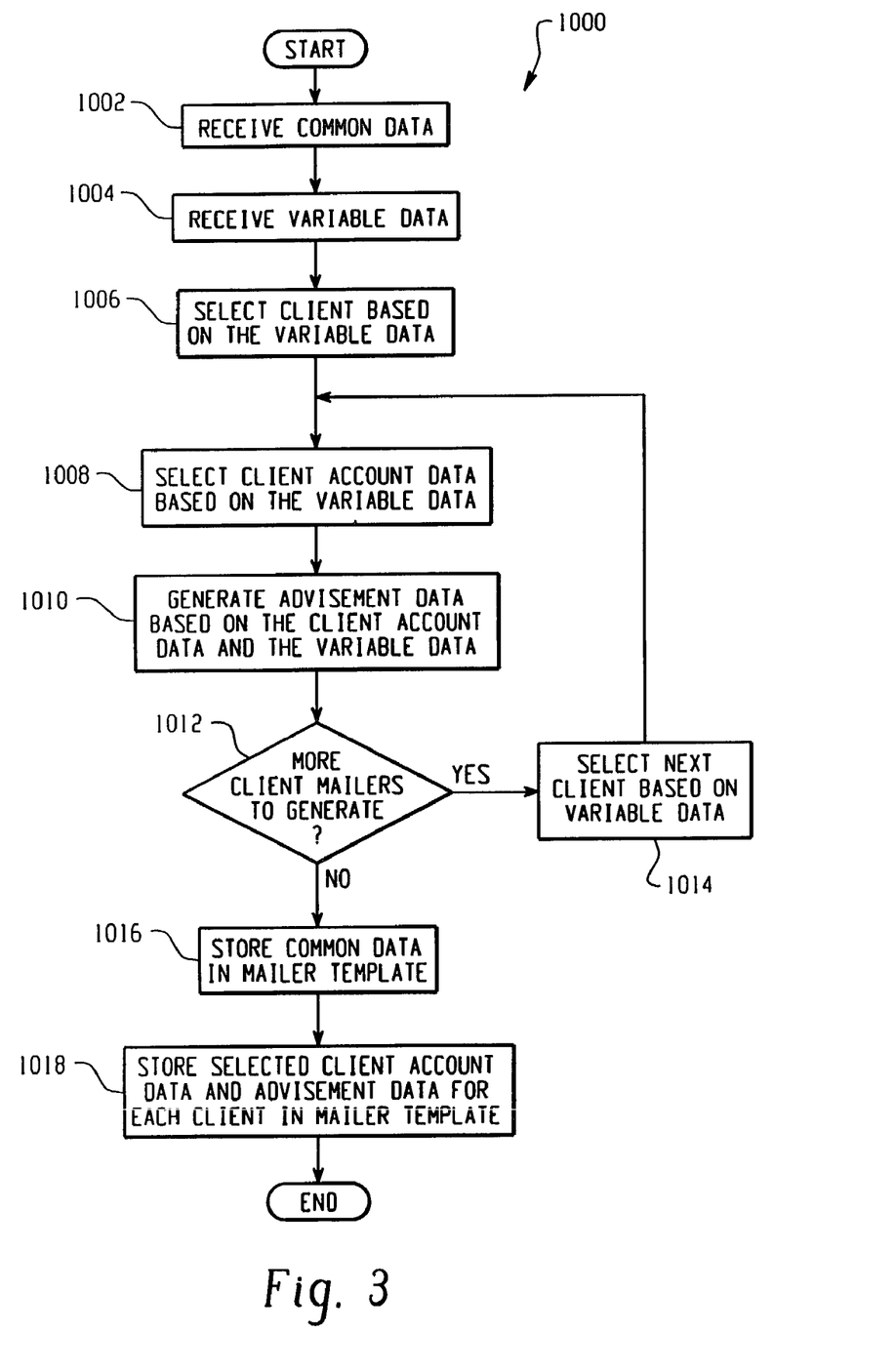
FIG. 3 is a flow diagram illustrating the process of creating a mailer template.

FIG. 3 provides a flow diagram 1000 illustrating the process of creating a mailer template 110. In step 1002, the system 10 receives the common data 112, and in step 1004, the system 10 receives the variable data 114. As previously described, the variable data 114 may include a list of client identifiers 104.

Based on the common data 112 and the variable data 114, the system 10 accesses the client account database 100 and generates the mailer template 110 in steps 1006 through 1018. Beginning in step 1006, the system 10 selects a first client based on the variable data 114. Illustratively, the first client is selected from the first client identifier 104 included in the variable data 114. In step 1008, the system 10 selects the selected client account data 108 based on the variable data 114. Based on the selected client account data 108 and variable data 112, the system 10 then generates the advisement data 116, as shown in step 1010.

After the advisement data 116 has been generated, the system 10 determines if additional client mailers 160 are to be generated, as shown in step 1012. If additional client mailers 160 are to be generated, system 10 selects the next client based on the variable data 114, as shown in step 1014. Steps 1008 and 1010 are thereafter repeated.

However, if there are no additional client mailers to generate, the system 10 then stores the common data 112 in the mailer template 110, as shown in step 1016. The system 10 then selects and stores the selected client account data 108 and advisement data 116 for each client in the mailer template 110, as shown in step 1018.

While the flow diagram 1000 of FIG. 3 has been illustrated as selecting clients from the client account database 100 basic on a list of client identifiers 104, other methods of selecting clients from the client account database 100 may also be implemented. For example, if the variable data 114 indicates that client mailers 160 are to be generated for each client receiving a particular service provided by the service provider, then for each client represented in the client account database 100, the system 10 may determine whether the client receives the particular service. If the system 10 determines that a client does receive a particular service, then a corresponding client account mailer 160 is generated.

As another example, the variable data 114 may indicate that clients receiving a first service provided by the service provider and not receiving a second service offered by the service provider are to receive a client mailer 160 comprising data related to first and second services. Again, the system 10 will access the client account database 100 and select the corresponding selected client account data 108.

Figure 4:
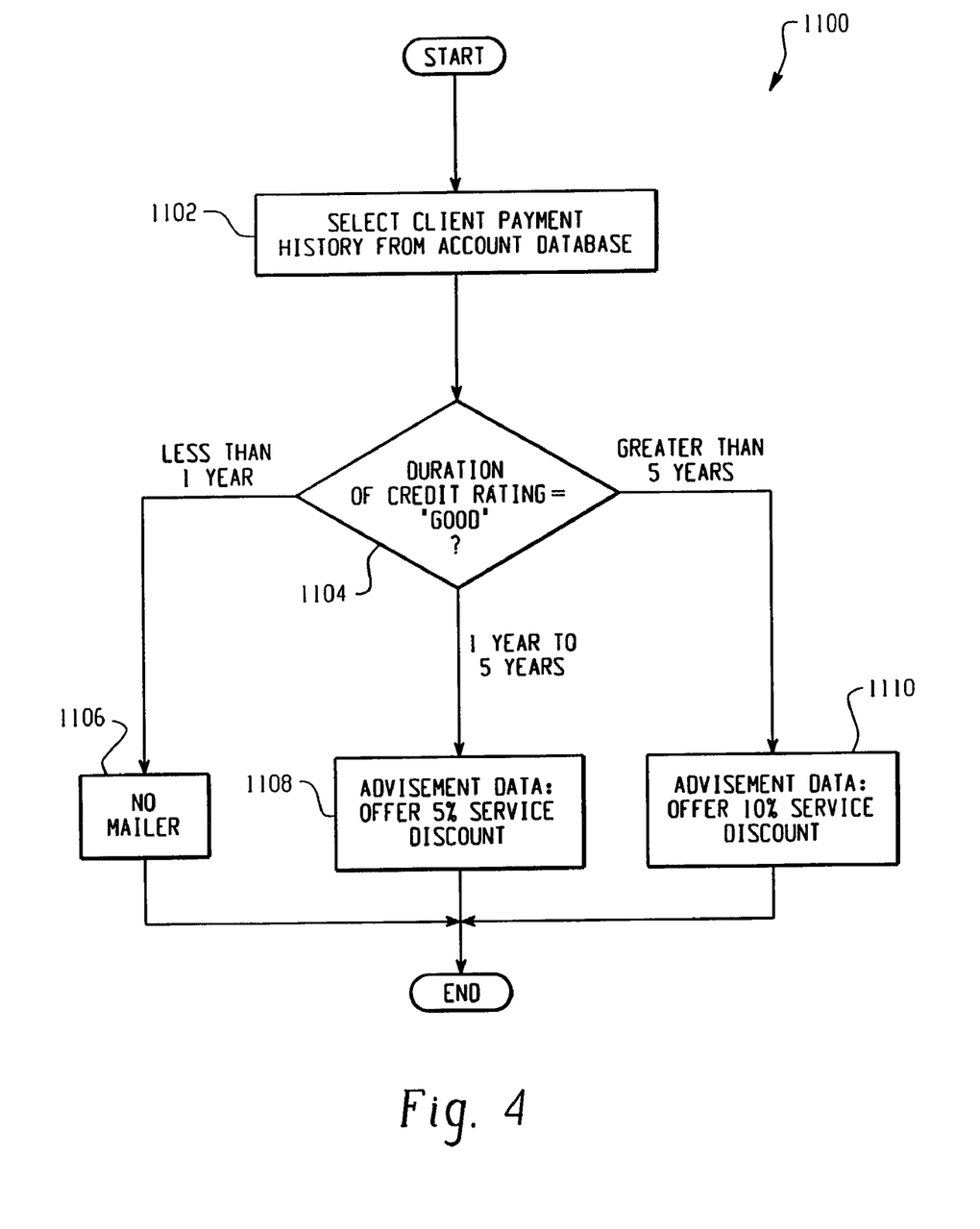
FIG. 4 is a flow diagram illustrating the process of creating advisement data based on client account data.

As previously mentioned, advisement data 116 is included in the client mailers 160. FIG. 4 provides a flow diagram 1100 illustrating the process of creating advisement data 116 based on selected client account data 108 selected from the client account database 100. In the illustrative flow diagram 1100 of FIG. 4, advisement data 116 is generated according to the length of a client's credit rating having a "Good" or "Bad" status.

In step 1102, the system 10 selects client payment history from the client account database 100. The client payment history for each client illustratively includes a corresponding client credit rating. In step 1104, the system determines the length of a client's "Good" credit rating by examining a credit rating of the client stored in the client account database 100. If the client has had a credit rating of "Good" for less than one year, the system 10 determines that no mailer shall be generated for the client, as shown in step 1106.

However, if the system 10 determines from the selected client account data 108 that the client has had a credit rating of "Good" for at least one year and up to five years, then the system 10 generates a client mailer for the client. The client mailer 160 includes advisement data 116 advising the client that the client is being offered a 5% service discount for one or more services provided or offered by the communications service provider to the client, as shown in step 1108.

Finally, if the system 10 determines that the client's credit rating of "Good" exceeds five years, then a different client mailer 160 is generated for the client. The client mailer 160 in the case of the client having a credit rating of "Good" in excess of five years contains advisement data 116 indicating that the client is being offered a 10% service discount for one or more services provided or offered by the communications service provider to the client, as shown in step 1110.

Figure 5:
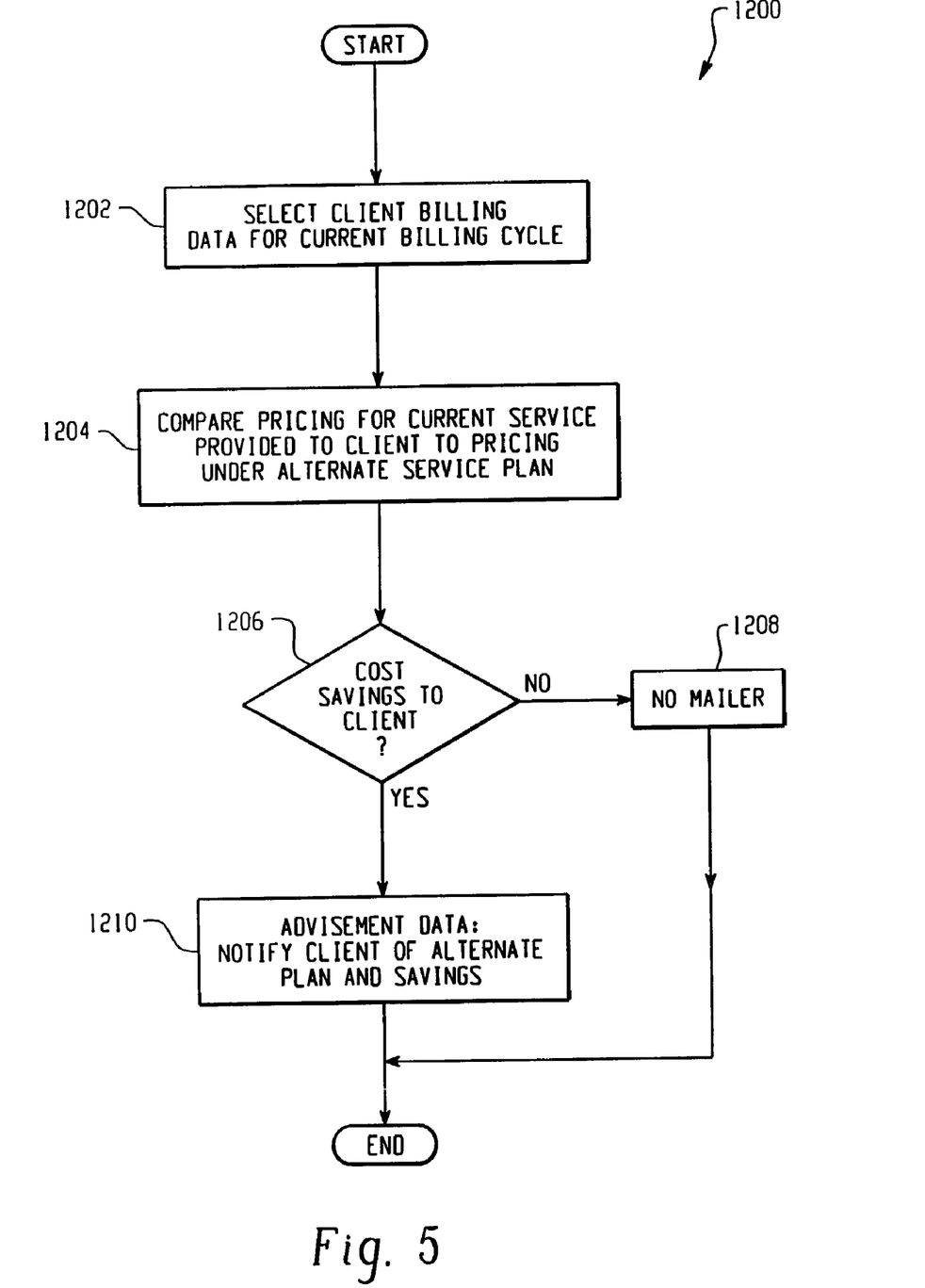
FIG. 5 is a flow diagram illustrating another process of creating advisement data based on client account data.

The illustrative flow diagram 1100 of FIG. 4 describes the generation of advisement data 116 based on selected client account data 108 comprising a client's credit rating over a number of billing cycles. Of course, other selected client account data 108 may also be used to generate corresponding advisement data 116. Furthermore, advisement data 116 may also be generated for client mailers 160 based on selected client account data 108 from only one billing cycle. FIG. 5 provides a flow diagram 1200 illustrating another process of creating advisement data 116 based on selected client account data 108 from one billing cycle.

In step 1202, the system 10 selects client account data 106 from the current billing cycle. In step 1204, the system 10 compares pricing for a current service provided to the client under a first service plan to pricing for a similar service under an alternate service plan offered by the communication service provider. For example, if the first service provided to the client by the communication service provider is a first long distance plan, the system 10 will apply the client's current usage as indicated in the current billing cycle to one or more altercate service plans offered by the communication service provider that is not provided to the client.

In step 1206, the system 10 determines whether there is a cost savings to the client under the one or more alternate service plans. If there is no cost saving to the client, then no client mailer 160 will be generated for the client, as shown in step 1208. However, if there is a cost saving to the client under the one or more alternate service plans, then the system 10 will generate a client mailer 160 for that client. The client mailer 160 will include advisement data 116 that notifies the client of the cost savings under the one or more alternate service plans, as shown in step 1210.

Figure 6:
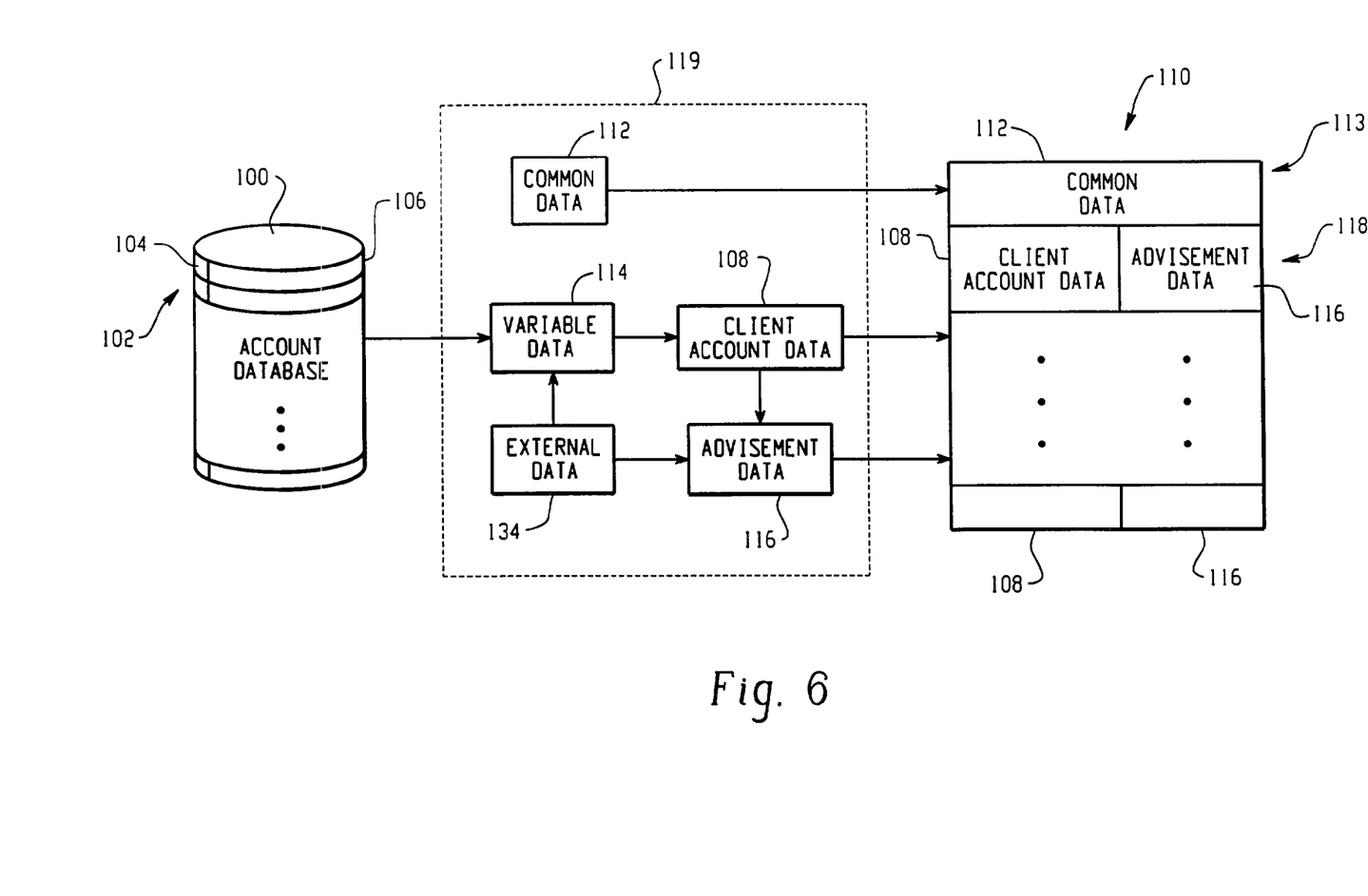
FIG. 6 is a block diagram illustrating another embodiment of the portion of the system that is operable to create a mailer template.

Advisement data 116 may also be based on external data 134 in addition to being based on the selected client account data 108 and the variable data 114. FIG. 6 is a block diagram illustrating another embodiment of the system 10 that is operable to create a mailer template 110. In the embodiment of FIG. 6, the system 10 is further operable to generate advisement data 116 based on external data 134. External data 134 may comprise data not stored in the client account database 100. Examples of external data 134 are data related to regulatory pricing changes not currently in effect; data related to a decision by the communication service provider to discontinue or modify a service offered by the communication service provider, and the like.

The system 10 may also be further operable to determine which clients are to receive a corresponding mailer 160 based on the external data 134 and the variable data 114. For example, if the external data 134 relates to a particular service currently provided by the communication service provider and this is to be discontinued, corresponding client mailers 160 may be sent to each client currently receiving the particular service. Each mailer 160 would also include particular advisement data 116 for each client, the advisement data 116 based on the selected account data 108, the variable data 114, and the external data 134. The advisement data 116 would illustratively inform the client that the particular service is being discontinued, and include information related to other services that may be provided in place of the particular service to be discontinued.

After the mailer template 110 is created, the assembly module 120 accesses the mailer template 110 and for each client identified by the client identifier 104 creates a corresponding record 132 in the mailer file 130. Each record 132 includes selected client account data 108, the common data 112, and the advisement data 116. Each record 132 is illustratively an electronic store of a corresponding client mailer 160.

In one embodiment, the common data 112 stored in the mailer template 110 includes variable fields corresponding to the selected client data 108 and the advisement data 116, and the assembly module 120 inserts the corresponding selected client data 108 and advisement data 116 into the common data 112 to generate each corresponding client mailer 160 for an identified client. Accordingly, the mailer file 130 comprises an electronic store of a completed set of corresponding client mailers 160.

Figure 7:
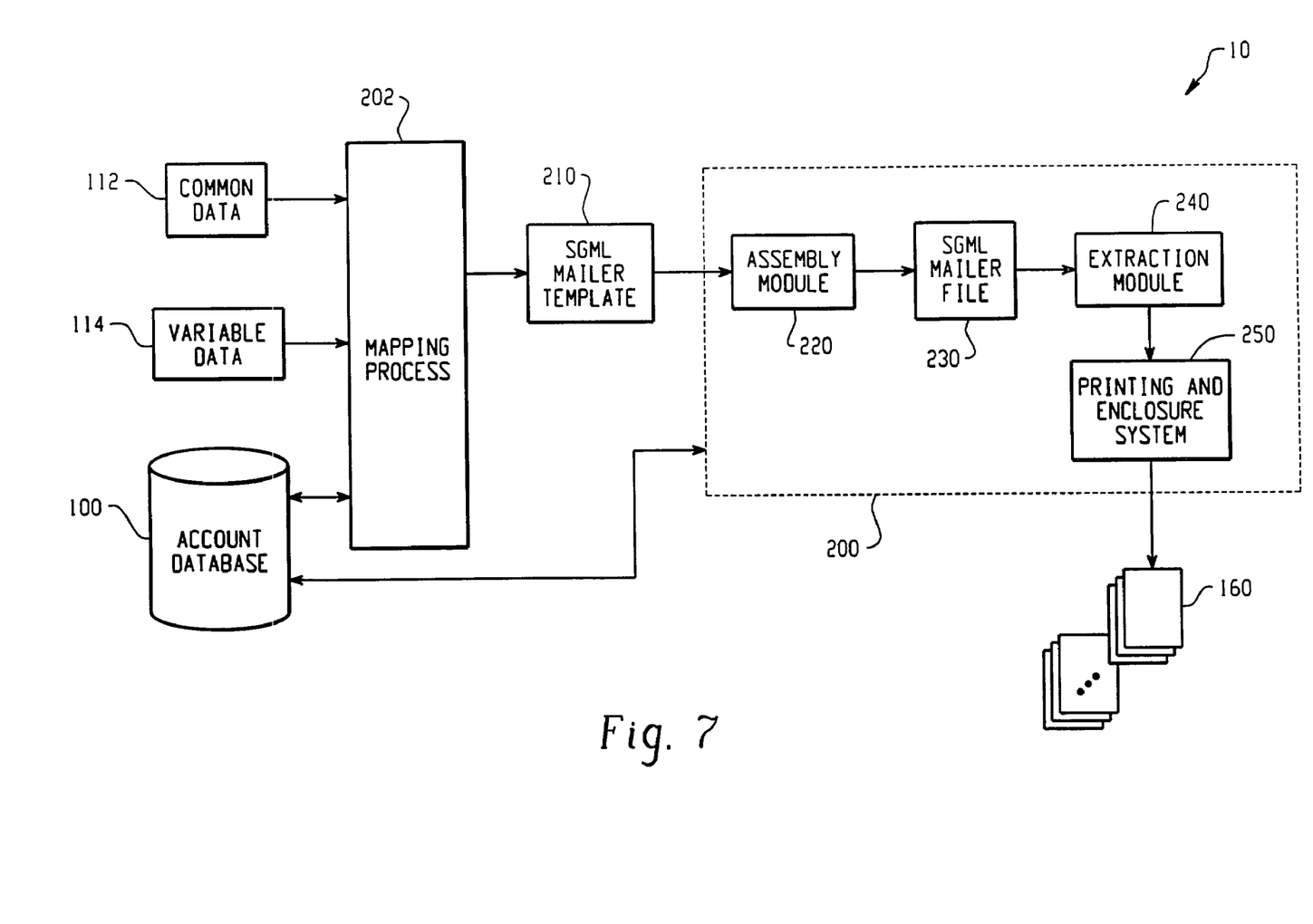
FIG. 7 is a block diagram of the system integrated into an existing billing system.

FIG. 7 provides a block diagram of another embodiment of system 10 as integrated into a billing system 200. The embodiment of FIG. 7 utilizes the communication service provider's existing billing system 200 comprising a printing and enclosure system 250 for printing and enclosing the client mailers 160, thus minimizing or eliminating costs associated with preparing client mailers 160 on a stand alone system or via a separate service provider. Illustratively, the printing and enclosure system 250 may comprise an Open Print system available from Sefas Innovation, Inc., and an InfoPrint printer system available from IBM.

In the embodiment of FIG. 7, the assembly module 220 and the extraction module 240 are stored on a billing system 200 in a format executable by the billing system 200. A mapping process 202 receives the common data 112, the variable data 114 and accesses the account database 100. The mapping process 202 generates a mailer template 210 in a manner similar to that described with respect to FIGS. 1-5. However, the mapping process 202 generates a Standard Generalized Markup Language (SGML) mailer template 210. The SGML mailer template 210 comprises the same information as the mailer template 110, except that it is in a standardized SGML format.

The assembly module 220, which is integrated into the billing system 200, generates an SGML mailer file 230. The SGML mailer file 230 comprises similar data as the mailer file 130 described in FIG. 1, except that it is provided in a standard SGML format. In one embodiment, the common data 112, the selected client account data 108, and the advisement data 116 are stored in a completed mailer format for each client to receive a client mailer 160, i.e., the SGML mailer file 230 comprises a plurality of electronically stored completed client mailers 160.

The extraction module 240 accesses the SGML mailer file 230 and converts the SGML mailer file 230 into a file format readable by the printing and enclosing system 250 of the billing system 200. The printing and enclosing system 250 of the billing system 200 then produces the plurality of client mailers 160.

Accordingly, the embodiment of FIG. 7 integrates the system 10 into a communications service provider's existing billing system 200 and utilizes the communication service provider's existing printing and enclosing system 250. Thus, the plurality of client mailers 160 may be generated and enclosed with each billing statement of each client served by the service provider at very little additional cost. Alternatively, the plurality of client mailers 160 can be generated separately and at different times from a billing run of the billing system 200, and thus the communications service provider can utilize its existing hardware and software capabilities in its billing system 200, minimizing costs associated with separately generating the plurality of client mailers 160.

While the embodiment of FIG. 7 shows the assembly module 220, the SGML mailer file 230, and the extraction module 240 integrated in or being processed within the billing system 200 of the communication service provider, other configurations of the system 10 are also possible. For example, the system 10 may be operable to remotely access to the account database 100, and may remotely process all steps associated with the generation of the plurality of client mailers 160 at a remote location. Thereafter, the system 10 may access the billing system printing and enclosing system 250, and the extraction module 240 may thereafter directly communicate with the printing and enclosing system 250 of the billing system 200 and convert the mailer file 230 into a format readable by the printing and enclosing system 250. Accordingly, the generation of the plurality of client mailers can be centrally located, even if a communication service provider has a plurality of billing systems 200 at separate geographic locations. Furthermore, the system 10 may perform nearly all of its processing steps independent of the printing and enclosing system 250 utilized by the communication service provider, as the extraction module 240 is operable to convert the processed data into a format usable by the printing and enclosing system 250.

Figure 8:
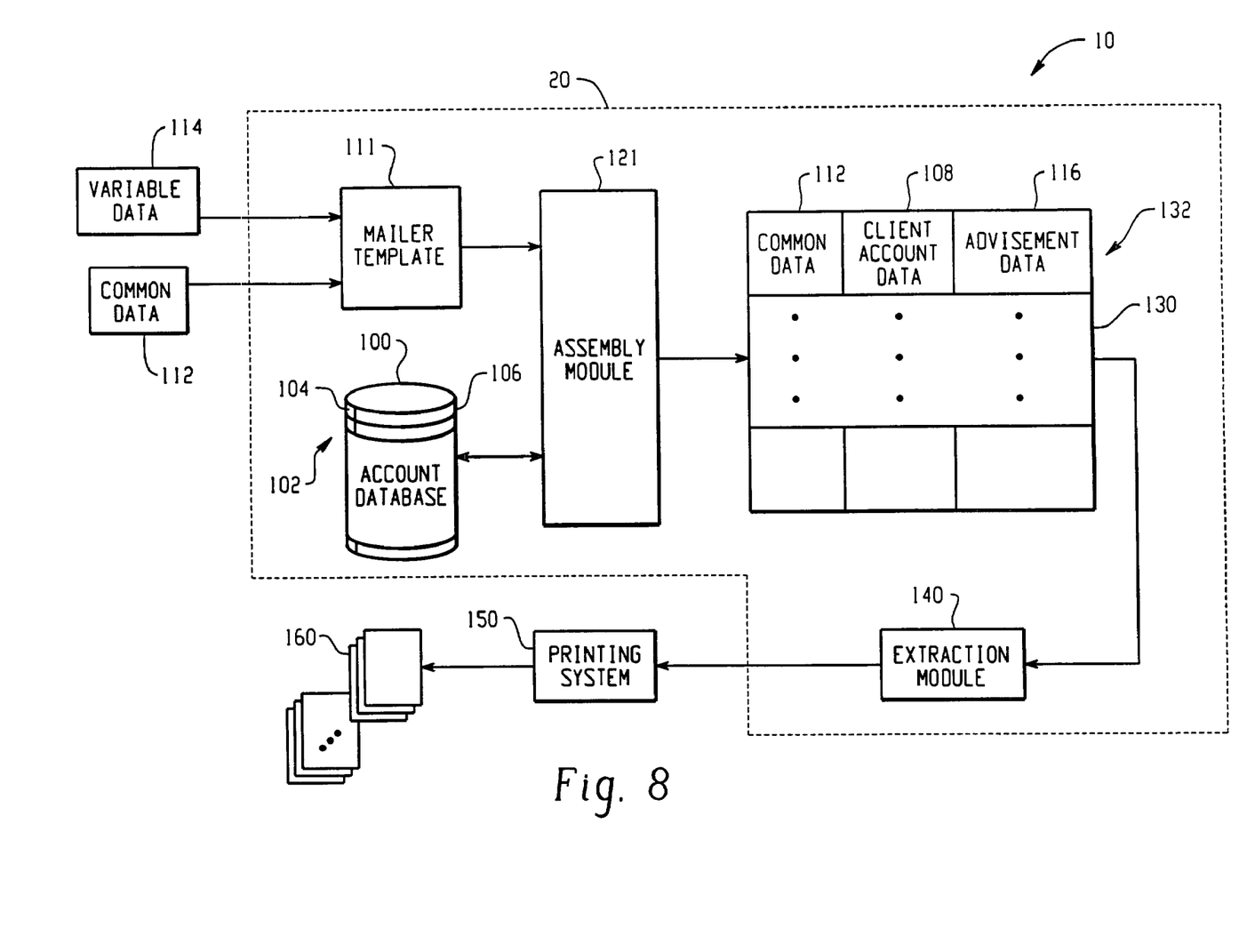
FIG. 8 is a block diagram illustrating another embodiment of the system for generating a plurality of mailers based on variable account data.

Selected processes may also be executed at different processing stages in the system 10. FIG. 8 is a block diagram of another embodiment of the system 10. In this embodiment, a mailer template 111 stores the common data 112 and the variable data 114. An assembly module 121 accesses the mailer template 111 and receives the common data 112 and the variable data 114. The assembly module 121 accesses the client account database 100 and selects the selected client account data 108 from the client account data 106 based on the variable data, and then generates the corresponding advisement data 116. In all other respects the embodiment of FIG. 8 is similar to the embodiments of FIGS. 1-6.

In another embodiment, generation of the advisement data 116, and storage of the selected client account data 108, the common data 112 and the advisement data 116 in the mailer file 130 may be generated in a single process, thus eliminating the intermediate process of generating a mailer template 110. Other processing distribution configurations may also be implemented.

Not all of the above-described processes need be implemented as a set of instructions executed on a computer system 20. For example, generation of the advisement data 116, or even selection of selected client account data 108, may be done manually by a user having access to the computer system 20. Additionally, generation of the common data 112 and the variable data 114 may also be done manually by a user having access to the computer system 20. Other processes as described above may also be executed by partial user intervention.

The embodiments described herein are examples of structures, systems or methods having elements corresponding to the elements of the invention recited in the claims. This written description may enable those of ordinary skill in the art to make and use embodiments having alternative elements that likewise correspond to the elements of the invention received in the claims. The intended scope of the invention thus includes other structures, systems or methods that do not differ from the literal language of the claims, and further includes other structures, systems or methods with insubstantial differences from the literal language of the claims.

What is claimed is:

1. A system for creating a plurality of client mailers for a plurality of clients of a communication service provider having an account database storing client account data related to one or more services provided by the communication service provider to each client during one or more billing cycles, the system comprising:

a processor having a first assembly module configured to receive common data and variable data, the common data comprising data to be included in each client matter, and the variable data used for selecting client account data specific to each client for inclusion into the client mailer, and further configured to select client account data specific to each client based on the variable data, generate advisement data specific to each client based on the selected client account and the variable data, and store the common data, the selected client account data and the advisement data in a mailer template file, wherein the advisement data includes a comparison between usage of a communication service plan by the client as indicated in the one or more billing cycles from the client account data and one or more alternative communication service plans, wherein the variable data comprises a client identifier variable, and wherein the first assembly module is further configured to create the mailer template file based on the client identifier variable, the client identifier variable including information indicating whether the client's balance over one or more billing cycles has exceeded a predetermined amount for a particular service provided by the communications service provider.

2. The system of claim 1, further comprising:

a printing system operable to print the plurality of client mailers; and an extraction module operable to access the mailer file and convert the mailer file into a format readable by the printing system.

3. The system of claim 2, wherein for each client the client mailer is included with a billing statement.

4. The system of claim 3, wherein the advisement data of comprises advisement data generated according to a length of time a client has a particular credit rating.

5. The system of claim 1, wherein the mailer template file and the mailer file are SGML files.

6. The system of claim 1, wherein the selected client account data comprises summarized Internet access time over several billing cycles for Internet access time, and wherein the advisement data comprises a related cost over several billing cycles for Internet access time for a second internet service offered by the communication service provider.

7. The system of claim 1, wherein the advisement data further comprises data relating to modification of one or more services provided by the communication service provider to the client.

8. The system of claim 1, further comprising a second assembly module operable to access the mailer template file and for each client create corresponding client mailer data comparing the common data, the selected client account data, and the advisement data and store the corresponding client mailer data for each client in a mailer file.

9. A method of generating a plurality of client mailers for a plurality of clients of a communication service provider, the method comprising:
generating common data for the client mailer;
generating, via a computer processor, variable data for the client mailer, wherein the variable data comprises a client identifier variable,
accessing an account database storing client account data related to one or more services provided by the communication service provider to each client for one or more billing cycles;
selecting client account data from the account database according to the variable data for each client mailer to be generated;
generating, via a computer processor, advisement data based on the client account data specific to the client and the variable data for each client mailer to be generated, wherein the advisement data includes a comparison between usage of a communication service plan by the client as indicated in the one or more billing cycles from the client account data and at least one alternative communication service plan;
combining the common data, the client account data, and the advisement data into a mailer template; and
accessing the mailer template and assembling, via an assembly module, the common data, the client account data, and the advisement data into corresponding client mailer data for each client mailer to be generated, wherein the mailer template is the corresponding client mailer data is assembled based on the client identifier variable, the client identifier variable including information indicating whether the client's balance over one or more billing cycles has exceeded a predetermined amount for a particular service provided by the communications service provider.

10. The method of claim 9, further comprising:
storing the corresponding client mailer data for each client mailer to be generated in a mailer file.

11. The method of claim 10, further comprising converting the mailer file into a format readable by a billing system.

12. Computer software stored on a commuter readable media, the computer software comprising program code for carrying out a method according to claim 9.

13. A system for generating a plurality of client mailers for a plurality of clients of a communication service provider, the system comprising:
means for generating common data for the client mailer;
means for generating variable data for the client mailer, wherein the variable data comprises a client identifier variable;
means for accessing an account database storing client account data related to one or more services provided by the communication service provider to each client during one or more billing cycles;
means for selecting client account data from the account database according to the variable data for each client mailer to be generated;
means for generating advisement data specific to the client based on the client account data and the variable data for each client mailer to be generated wherein the advisement data includes a comparison between usage of a communication service plan by the client as indicated in the one or more billing cycles from the client account data and at least one alternative communication service plan; and
means for assembling the common data, the client account data, and the advisement data into corresponding client mailer data for each client mailer to be generated, wherein the client mailer data mailer is assembled based on the client identifier variable, the client identifier variable including information indicating whether the client's balance over one or more billing cycles has exceeded a predetermined amount for a particular service provided by the communications service provider; and
means for storing the corresponding client mailer data for each client mailer to be generated in a mailer file.

14. The system of claim 13, further comprising means for converting the mailer file into a format readable by a billing system.

15. A system for creating a plurality of client mailers for a plurality of clients of a communication service provider having an account database storing client account data related to one or more services provided by the communication service provider to each client during one or more billing cycles, the system comprising:
a mailer template file comprising common data and variable data; and
a processor having an assembly module configured to access the mailer template file and for each client create corresponding client mailer data comprising the common data, client account data specific to the client, the client account data selected from the account database according to the variable data, and advisement data, the advisement data based on the client account data specific to the client and the variable data, wherein the advisement data includes a comparison between usage of a communication service plan by the client as indicated in the one or more billing cycles from the client account data and one or more alternative communication service plans, and the assembly module further configured to store the client mailer data in a mailer file, wherein the variable data comprises a client identifier variable, and wherein the assembly module is further configured to create the corresponding mailer data based on the client identifier variable, the client identifier variable including information indicating whether the client's balance over one or more billing cycles has exceeded a predetermined amount for a particular service provided by the communications service provider.

16. The system of claim 15, further comprising:
a billing system, the billing system having access to the account database and operable to produce and print billing statements for each client; and
an extraction module operable to access the mailer file and convert the mailer file into a format readable by the billing system so that the billing system is further operable to print client mailers for each client.

17. The system of claim 16, wherein for each client the client mailer is included with the billing statement.

18. The system of claim 15, wherein the mailer template file and the mailer file are SGML files.

19. The system of claim 15, wherein the advisement data comprises advisement data generated according to a length of time a client has a particular credit rating, and wherein the selected client account data comprises summarized Internet access time over several billing cycles for Internet access time, and wherein the advisement data comprises a related cost over several billing cycles for internet access time for a second internet service offered by the communication service provider.

20. A computer readable medium containing instructions that are executed by a processor for generating a plurality of client mailers for a plurality of clients of a communication serviced provider to perform acts comprising:
- generating common data for the client mailer;
- generating variable data for the client mailer, wherein the variable data comprises a client identifier variable;
- combining the common data and the variable data into a mailer template file;
- accessing an account database storing client account data related to one or more services provided by the communication service provider to each client during one or more billing cycles;
- selecting client account data from the account database according to the variable data for each client mailer to be generated, wherein the variable data includes a client identifier variable, the client identifier variable including information indicating whether the client's balance over one or more billing cycles has exceeded a predetermined amount for a particular service provided by the communications service provider; and
- generating advisement data based on the client account data specific to the client and the variable data for each client mailer to be generated, wherein the advisement data includes a comparison between usage of a communication service plan by the client as indicated in the one or more billing cycles from the client account data and at least one alternative communication service plan.

21. The computer readable medium of claim 20, further comprising converting the mailer file into a format readable by a billing system.

* * * * *